United States Patent
Stronconi (10) Patent No.: US 8,708,416 B2
(45) Date of Patent: Apr. 29, 2014

(54) ROTATABLE CERVICAL PILLOW FOR HEAVY EQUIPMENT AND OTHER VEHICLES

(71) Applicant: Charles J Stronconi, Shirley, NY (US)

(72) Inventor: Charles J Stronconi, Shirley, NY (US)

(*) Notice: Subject to any disclaimer, the term of this patent is extended or adjusted under 35 U.S.C. 154(b) by 0 days.

(21) Appl. No.: 13/733,638

(22) Filed: Jan. 3, 2013

(65) Prior Publication Data
US 2013/0119716 A1      May 16, 2013

Related U.S. Application Data

(63) Continuation-in-part of application No. 13/065,257, filed on Mar. 17, 2011, now abandoned.

(51) Int. Cl.
*A47C 7/38*      (2006.01)

(52) U.S. Cl.
USPC ............................................. 297/397

(58) Field of Classification Search
USPC ............... 297/397, 188.06, 188.05, 408
See application file for complete search history.

(56) References Cited

U.S. PATENT DOCUMENTS

| | | | | |
|---|---|---|---|---|
| 283,443 | A | * | 8/1883 | Wellman ....................... 297/408 |
| 448,424 | A | * | 3/1891 | Gilfillan ......................... 297/94 |
| 541,249 | A | * | 6/1895 | Price ............................... 297/69 |
| 1,468,268 | A | | 9/1923 | Karr |
| 2,013,481 | A | * | 9/1935 | Stonehill ........................... 5/640 |
| 2,865,434 | A | * | 12/1958 | Grenz ........................... 297/403 |
| 3,174,163 | A | | 3/1965 | Gibson |
| 3,537,749 | A | * | 11/1970 | Putsch et al. .................. 297/408 |
| 4,190,290 | A | * | 2/1980 | Strien ............................ 297/408 |
| 4,206,945 | A | * | 6/1980 | Kifferstein ..................... 297/220 |
| 4,391,438 | A | | 7/1983 | Heffington, Jr. |
| D272,300 | S | | 1/1984 | Dziurman, Jr. |
| 4,535,878 | A | | 8/1985 | Grahl |
| 4,803,743 | A | * | 2/1989 | Greenawalt ....................... 5/636 |
| 4,822,093 | A | | 4/1989 | Kawai |
| 4,881,777 | A | * | 11/1989 | Dorshimer .................... 297/406 |
| 4,971,393 | A | * | 11/1990 | Maisenhalder ............... 297/397 |
| 5,108,150 | A | * | 4/1992 | Stas et al. ...................... 297/397 |
| D332,663 | S | * | 1/1993 | Liszewski ..................... D24/190 |
| 5,207,481 | A | * | 5/1993 | Ayala et al. .................... 297/464 |
| 5,374,238 | A | * | 12/1994 | Xiao ............................... 601/57 |
| 5,457,136 | A | * | 10/1995 | Hartranft et al. ........... 521/109.1 |
| 5,503,456 | A | * | 4/1996 | Rossini ......................... 297/397 |
| 5,535,467 | A | | 7/1996 | Ciske |

(Continued)

FOREIGN PATENT DOCUMENTS

| | | | | |
|---|---|---|---|---|
| DE | 3543980 A1 | * | 6/1987 | ............... A47C 7/38 |
| GB | 2012570 A | * | 8/1979 | ............... A47C 7/38 |

*Primary Examiner* — David E Allred
(74) *Attorney, Agent, or Firm* — Alfred M. Walker (57) ABSTRACT

A rotatable circular crossection cervical pillow is manually rotated in a continuous fashion as desired by a person whenever a fresh clean contact spot is sought, or a contact spot of variable support is sought, while the pillow is still attached to a seat back. The rotatable pillow is a cylinder of medium and/or firm high density polyurethane foam. An axial through-hole in the center permits the snug insertion of a rigid length of tubing to give the pillow axial rigidity. Swivel fixtures are attached at each end of the pillow by virtue of the central tube. A fabric cover with an opening closure covers the entire polyurethane cylinder snugly. Optionally the cover may carry therapeutic imparting elements therein. Straps with adjustable buckles are attached to each swivel fixture. Therefore, the cervical pillow rotates easily while still strap-attached to the seat back.

11 Claims, 5 Drawing Sheets

(56) References Cited

U.S. PATENT DOCUMENTS

| | | |
|---|---|---|
| 5,544,378 A | 8/1996 | Chow |
| 5,572,757 A * | 11/1996 | O'Sullivan ......................... 5/636 |
| 5,633,286 A * | 5/1997 | Chen ............................. 524/474 |
| 5,642,542 A | 7/1997 | Kometani |
| D382,164 S * | 8/1997 | Hays ............................... D6/601 |
| 5,708,998 A | 1/1998 | Torbik |
| D406,486 S * | 3/1999 | Ogilvie ........................... D6/596 |
| 5,904,406 A * | 5/1999 | Stewart ........................... 297/397 |
| D420,408 S * | 2/2000 | Santimaw ....................... D21/694 |
| 6,086,152 A * | 7/2000 | Zeller .......................... 297/284.5 |
| D445,506 S * | 7/2001 | Vinson et al. ................. D24/183 |
| 6,449,788 B1 * | 9/2002 | Nichols ............................. 5/636 |
| 6,484,335 B2 | 11/2002 | Gilbert |
| 6,601,804 B2 * | 8/2003 | Bisch ............................. 248/118 |
| 6,748,615 B1 | 6/2004 | Tiedemann |
| 6,895,619 B1 | 5/2005 | Lee |
| 6,990,699 B2 * | 1/2006 | Hedges ............................. 5/652 |
| D543,066 S * | 5/2007 | Ohno .............................. D6/601 |
| 7,740,318 B2 * | 6/2010 | Funke et al. ................... 297/393 |
| 7,918,774 B2 * | 4/2011 | Dye ................................ 482/132 |
| D679,929 S * | 4/2013 | DiBernardo ................... D6/601 |
| 2005/0173961 A1 * | 8/2005 | Morphew et al. ............. 297/397 |
| 2005/0198738 A1 * | 9/2005 | Hedges ............................. 5/636 |
| 2008/0034504 A1 | 2/2008 | Schmidt |
| 2014/0000034 A1 * | 1/2014 | Alexander ........................ 5/636 |

\* cited by examiner

ROTATABLE CERVICAL PILLOW FOR HEAVY EQUIPMENT AND OTHER VEHICLES

RELATED APPLICATIONS

This application is a combination-in-part of application Ser. No. 13/065,257 filed on Mar. 17, 2011, and claims priority under 35 USC. 120 therefrom.

FIELD OF THE INVENTION

The present invention relates to rotatable cervical collar pillows for use by operators of heavy equipment and other vehicles. It can also be used with stationary household furniture seats.

BACKGROUND OF THE INVENTION

Cervical or neck support pillows or bolsters are used by seated individuals for comfort and to prevent neck strain. They are especially useful for heavy equipment operators exposed to large amplitude vibrations and shock on uneven ground.

Cylindrically shaped cervical pillows for attachment to chairs or to vehicle seats are well known in the prior art. For example, U.S. Pat. No. 6,484,355 of Gilbert is a pillow apparatus attachable to the back of a lawn chair by VELCRO® straps. Tiedemann, in his U.S. Pat. No. 6,748,615, describes a neck support pillow attachable to a vehicle seat back via adjustable straps. Other head support pillows include U.S. Design Pat. D445,506 of Vinson et al. and U.S. Design Pat. D382,164 of Hays.

Furthermore, U.S. Pat. No. 4,391,438 of Heffington describes a rotatable surgical thigh support panel 14 which is rectangular in crossection. Heffington '438 is not cylindrical in crossection, so it could not be manually adjusted while still behind the neck of the user, in that the longer longitudinal side edge axis of Heffington '438's rectangular padded support panel would, when rotated in the position directly behind a neck (if modified as a neck pillow), compel the user to awkwardly move the user's neck forward away from the rectangular padded support panel, to try and accommodate the longer longitudinal side axis of the support panel. Furthermore, if the user were to rotate the rectangular panel 90° to the short end, the short end would only contact a small portion of the user's neck and would therefore be contraindicated for supporting the neck. Also, Heffington '438 has clamps to fix the support panel in position, which could not be user operable while the user is sitting in position with the panel behind the neck of the user.

The seat back rest of U.S. Pat. No. 4,822,093 of Kawai does not rotate in a horizontal axis; instead it rotates in a vertical axis. Kawai '093 is not "manually adjustable". Moreover, the abdominal support movable cushion of U.S. Pat. No. 5,642,542 of Kometani is repositionable, but not internally axially rotatable, because it has to be picked up and physically placed in position, since it does not have an internally rotatable axis member. Kometani '542 also is not circular in crossection.

The rigors of heavy equipment use often are associated with perspiration of the operator and with dusty or grimy environments. If a cervical pillow is used in such a vehicle, it can be appreciated that it will quickly become soiled or wet and uncomfortable. The prior art does not reveal a rotatable cervical pillow which can mitigate these problems.

OBJECTS OF THE INVENTION

It is an object of the present invention to provide a rotatable, horizontally deployed cervical collar pillow for use by vehicle operators or passengers, especially for heavy equipment operators exposed to large amplitude vibrations and shock on uneven ground.

It is yet another object of the present invention to provide a rotatable horizontally deployed cervical collar pillow which rotates axially, so that a user can rotate the pillow away from the back of the neck to another area of the pillow which is not encumbered by body heat and sweat.

It is yet another object of the present invention to allow users to freely rotate the horizontally deployed cervical collar pillow without moving out of the seated position and without significantly moving the neck away from the pillow while it is being rotated.

It is also an object of the present invention to provide a cervical collar pillow with multiple neck accommodating regions.

It is yet another object of the present invention to improve over the disadvantages of the prior art.

Other objects which become apparent from the following description of the present invention.

SUMMARY OF THE INVENTION

The rotatable circular crossection cervical pillow of this invention can be manually rotated several degrees in a continuous fashion as desired by the operator of a heavy equipment vehicle, for providing alternate levels of firmness for neck support or whenever a fresh clean contact surface spot is sought, while the pillow is still attached to the vehicle seat back. After it is soiled around the periphery, the fabric cover can preferable be easily removed for laundering.

The rotatable pillow of this invention is based on the use of a cylinder cushion of medium or firm high density polyurethane foam (approximately 6" in diameter and 12" long, although the range of the diameter and length can vary). Foam material of this type in the desired shape can be obtained from suppliers, such as eFoamstore.com in Wilkes Barre, Pa. An axial through-hole in the center permits the snug insertion of a rigid length of tubing (preferably ½" or ¾" OD PVC) to give the pillow axial rigidity. Swivel fixtures are attached at each end of the pillow by virtue of the central tube. The respective washers of the cervical fixtures are preferably made of plastic or rubber, such as NEOPRENE® brand of polychloroprene rubber. The swivel fixture washers are preferably 1½" to 2½" in diameter. The hook and joining portions of the swivel fixtures are preferably plastic, although other suitable materials can be use.

A fabric cover with a closure, such as a VELCRO® opening closure, covers the entire polyurethane cylinder snugly. Other conventional closures such as zippers or buttons can be used. Straps with adjustable buckles, such as luggage strap buckles, cam buckles or parachute buckles, are attached to each swivel fixture. The strap ends terminate in compatible connectors, such as buckles or snap latch halves. Thus the horizontally deployed cervical pillow rotates easily while still strap-attached to the vehicle seat back.

The fabric cover can be made of fabric such as cotton, polyester, nylon or denim, or from special perspiration wicking fabrics, such as microfiber fabric made of ultrafine synthetic fibers which are soft, stretchy and stain resistant and which wick away moisture. The fabric cover can also be preferably made of other liquid resistant fabrics, such as sport nylon and other flexible fabrics, such as tear resistant ripstop nylon.

In general, the user rotatable cervical collar pillow includes a horizontally deployed cylindrical cushion assembly including a cylindrical cushion which is freely rotatable on a horizontal member along an axis of rotation of the cushion. The cylindrical cushion has a central axis and an outer surface extending between respective circumferential edges of respective opposite circular end edge surface portions, whereby the outer surface of the cylindrical cushion is radially spaced apart from the central axis of the cylindrical cushion at a constant distance with equal radial lengths extending from the central axis.

The rotatable cushion assembly is used in combination with a seat back of a seat, wherein it is mounted on the seat back of the seat so that the cylindrical cushion is positioned to contact and support the neck and head of the user sitting in the seat. In use, the user rotates a previously used segmented cushion surface portion of the cylindrical cushion away from the back of the head and neck of the user, whereby a cooler, cleaner and dryer segmented cushion surface portion, or of a different firmness, of the cylindrical cushion supports the neck and back of the head of the user on the cooler, cleaner and dryer cushion surface portion thereof.

The cylindrical cushion is optionally encased within the removable fabric cover to permit replacement and/or cleaning of the cover. Optionally, the cover can be non-removable. The cylindrical cushion is preferably mounted on a rigid, removable axially located hollow tube, having an elastic cord extending through the tube, wherein a swivel assembly is attached to each end of the elastic cord, thereby holding the elastic cord under elastic tension.

The swivel assemblies include the aforementioned elastic cord extending through the tube, or just an internal tube without an elastic cord, and the swivel assembly hook clasp attached to each end of the elastic cord, so that the elastic cord is under elastic tension by the swivel assemblies abutting opposite ends of the rigid axially extending tube. As a result, the cylindrical cushion and/or elastic cord have 360 degrees of rotation allowed by the swivel assemblies. In an alternate embodiment, the cushion is rotatable around fixed tubing and strap engaging end members.

A strap assembly is attached to the swivel assemblies for removably attaching the cylindrical cushion to the seat back of the user's seat. For example, a strap is attached to each opposite end of the swivel assemblies, and each distal end of each strap has respective engageable/releasable latches. Therefore, the cylindrical neck support cushion has 360 degrees of user operable rotation, with swivel assemblies having mechanisms to allow the rotation.

The rotatable therapeutic cervical neck support pillow can also be used as a travel pillow for automobiles, planes, trains, buses and other motor vehicles, as well as for use with stationary household furniture seats with high back rests.

Although primarily used for cervical neck support and therapy, in an alternate embodiment, the rotatable, therapeutic pillow can be attached lower on a seat back of a vehicle seat or chair seat for contacting the mid back thoracic region or low back lumbar region.

In an alternate embodiment, the therapeutic rotatable cervical neck support pillow includes at least one region portion accommodating one or more therapeutic imparting elements, such as, for example, elastomeric massage members, electronic stimulator pads, a heat pack or a cold pack therein. The elements can be held within pockets on the outer cover, may be carried by the cover itself or may be removably attachable to the cylindrical cushion.

In yet another alternate embodiment, the cylindrical cushion is made of a plurality of sections, such as a pair of half cylindrical sections, with one of the half sections being a firmer foam than the other half section of a softer foam. Optionally, the firmer section can be a smaller section than one-half of the foam cushion, or can be a smaller insert member insertable in a recessed portion of the cylindrical cushion.

In yet another alternate embodiment, the central support tube within the cylindrical cushion, as well as the attached swivel fixtures, are of a different type which are permanently attached by attachments, such as by press fitting or threaded mating.

BRIEF DESCRIPTION OF THE DRAWINGS

The present invention can best be understood in connection with the accompanying drawings. It is noted that the invention is not limited to the precise embodiments shown in drawings, in which:

FIG. 11 is a local close-up view of a threaded embodiment for the end clasps; and, FIG. 12 is a perspective view of a small auxiliary external firm massaging member, which has elastic connecting cables 71 with hooks 72 at each end, engageable with strap loops 64 on each side.

DETAILED DESCRIPTION OF THE INVENTION

Figure 1:
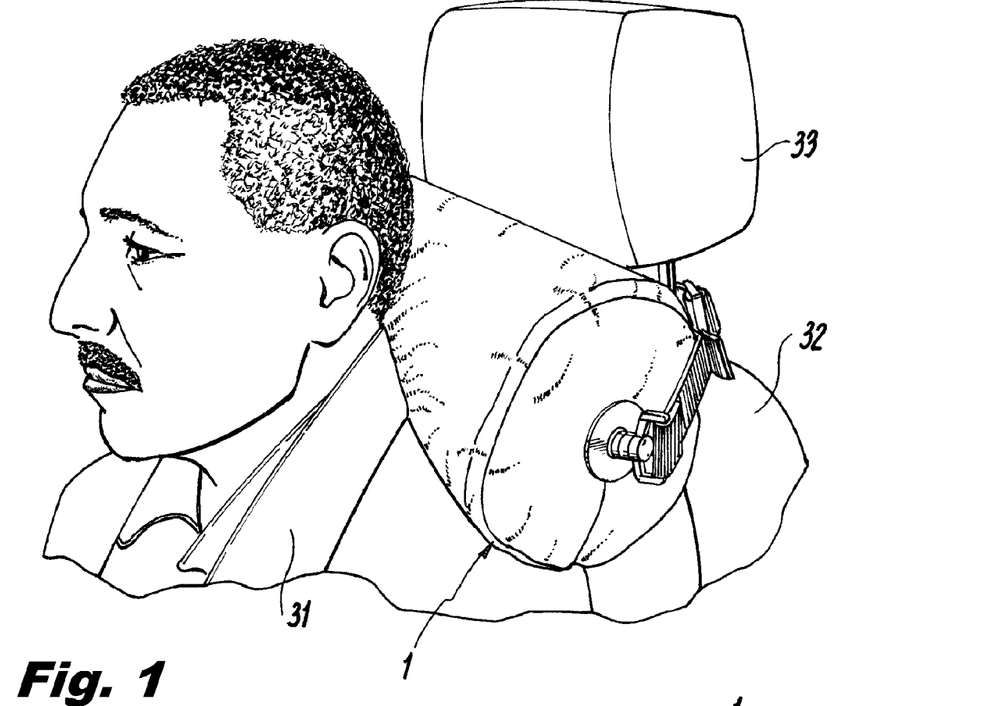
FIG. 1 is a side elevation showing the rotatable pillow of this invention strapped to a vehicle seat back below the headrest illustrating the position relative to a vehicle operator.

The cervical pillow 1 of this invention is shown supporting operator's 31 neck in FIG. 1. It is strapped on at the interface between seat back 32 and headrest 33.

Figure 2:
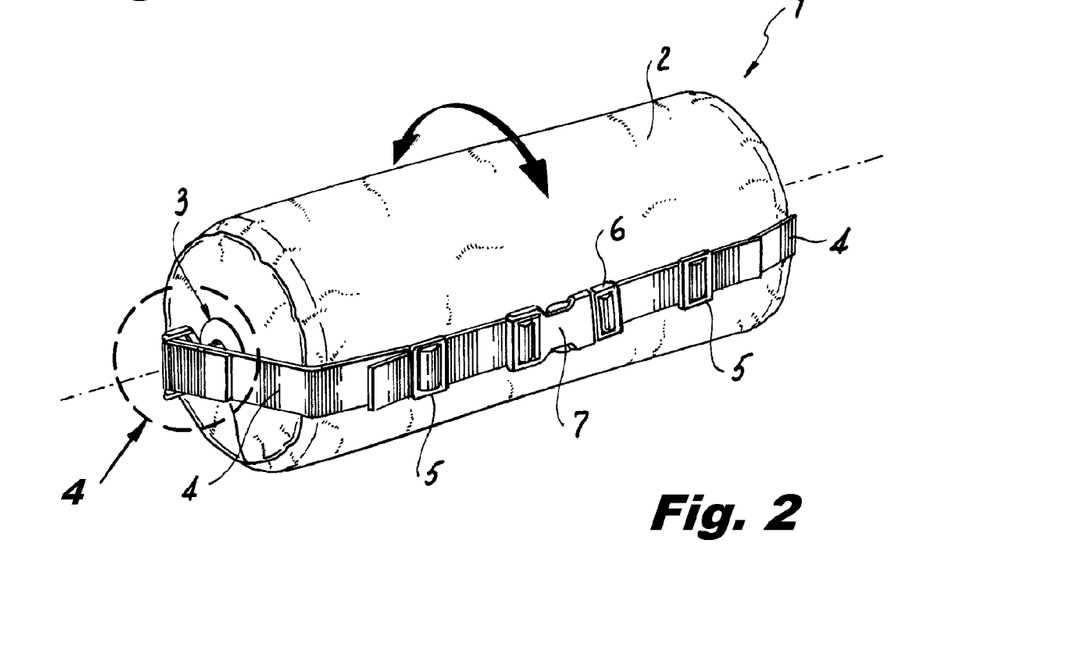
FIG. 2 shows a perspective view of a pillow of this invention with a dashed line illustrating the rotating feature.

FIG. 2 shows the major components of pillow 1 as assembled. Cushion section 2 is a fabric covered polyurethane circular cylinder with a circular crossection and a central bore, whereby the cylindrical cushion has equal radii extending from a central hole 18 extending end to end axially within cylindrical cushion 2. Swivel fixtures 3 (one of two shown) attach straps 4 with adjusting buckles 5 to cylindrical cushion section 2. Male latch end 6 is at the distal end of one strap 4 while female latch end 7 is at the other strap 4.

Figures 3, 4:
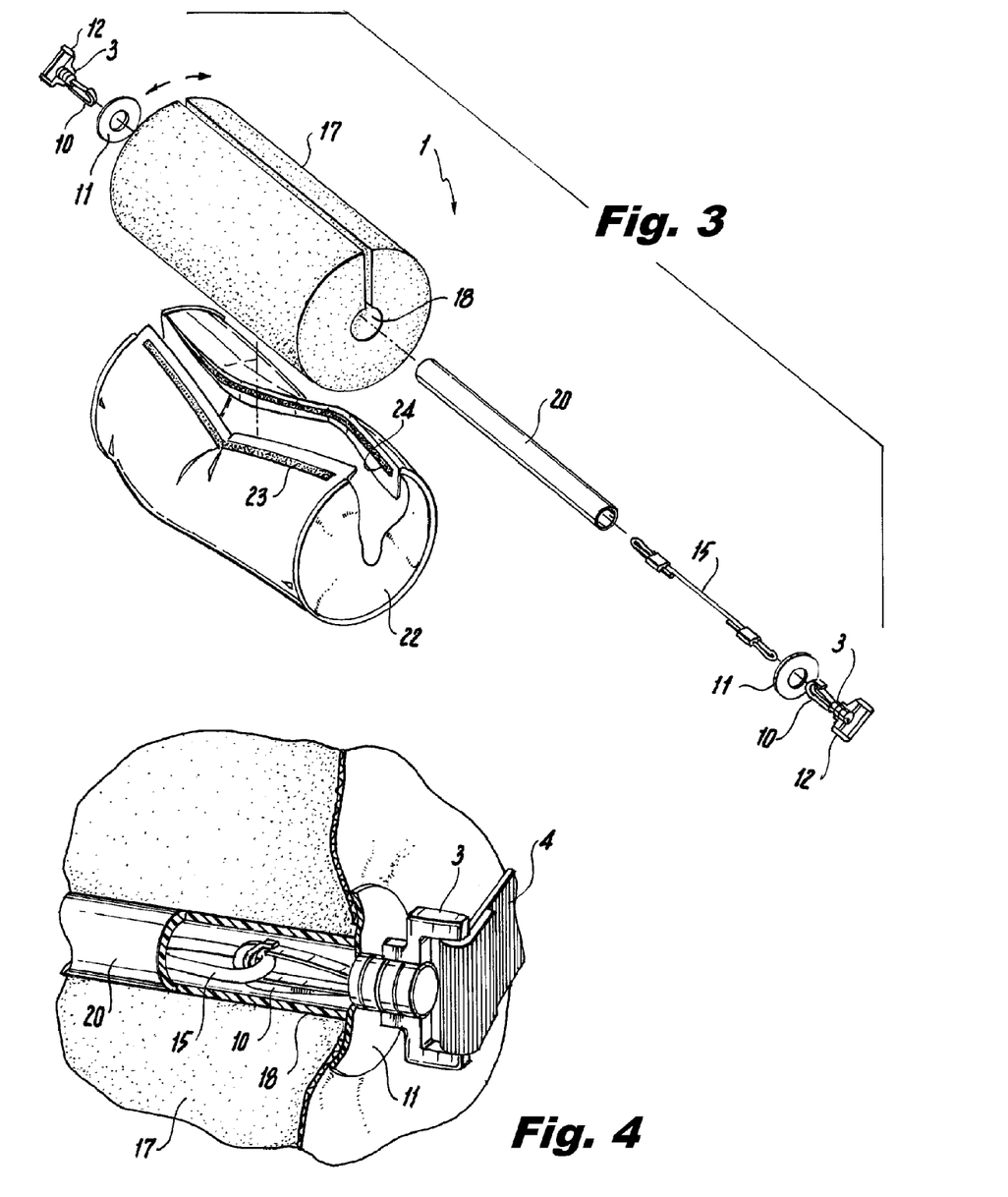
FIG. 3 is an exploded perspective view of the components of the rotatable cervical pillow of this invention.
FIG. 4 is a close-up cutaway view of the rotatable crossection subassembly thereof.

Although other methods can be used to assemble the components, FIGS. 3 and 4 show an effective method using inexpensive components. Polyurethane foam cylinder 17 has central hole 18 sized to snugly accept rigid hollow portion, such as, for example, a PVC tube 20 of equal length. The internal diameter ("ID") of tube 20 is large enough to house the snap hook section 10 of swivel assembly 3. The other parts of swivel assembly 3 are a large washer 11 and strap attachment 12 which can swivel freely relative to snap hook 10. Elastic cord (such as a bungee cord) 15 preferably has attachments for the connector snap hooks, such as loops, located at each end to be engaged with the snap hooks 10 of the swivel assemblies at each end. Cord 15 with formed end loops is shorter than tube 20 so that it holds both swivel fixtures 3 with washers 11 at the respective ends of tube 20 by virtue of its elastic tension.

Because the cylindrical cushion 2 rotates 360° about elastic cord 15 within central hole 18, it can be rotated without significantly moving the neck and head away from the cushion 2, to rotate the portion of the cushion 2 contacting the back of the head and neck of the user away, so that a cooler, cleaner portion of the cylindrical cushion 2 can then support the neck and back of the head of the user on a dryer, cooler cushion surface environment.

After rigid assembly of all of the parts, fabric cover 22, which has an opening along its length is fitted over polyurethane foam cylinder 17 (which may itself be covered by an inner fabric sleeve), and the long opening is sealed via fasteners, such as a VELCRO® strip 23 and a mating strip 24 on the inside surface of the outer flap. The ends of cover 22 are similarly tucked around the ends of cylinder 17 and held closed with optional snaps. The cover 22 is also optionally tucked under washers 11.

Figures 5, 6:
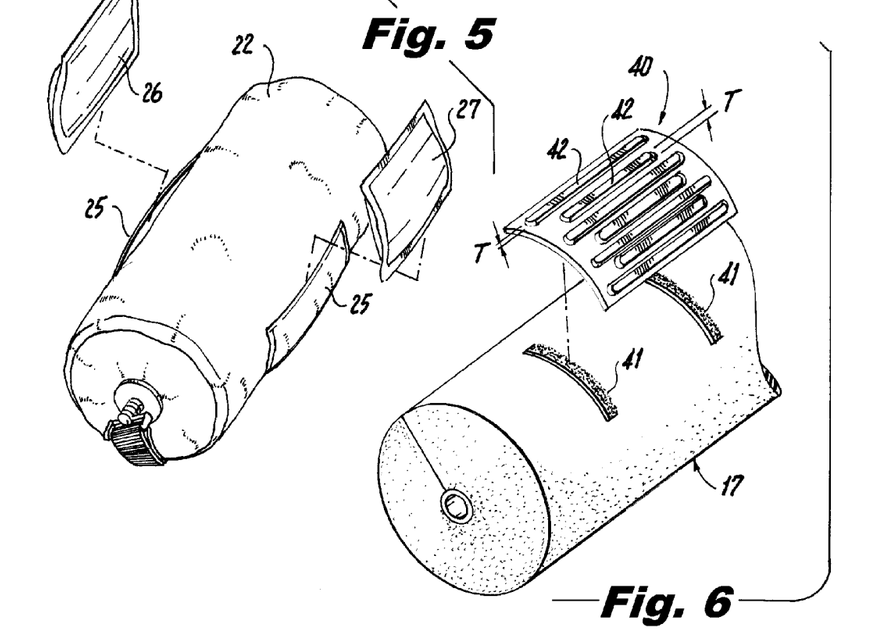
FIG. 5 is a detail view of an alternate embodiment, showing pockets in the cover for heat and/or cold packs to be inserted therein.
FIG. 6 is a detail view of a further embodiment for dual use foam cushion pillow, with a massage region, such as a plurality of axially extending ribbing rods therein.

As an alternate embodiment as shown in FIG. 5, the cover 22 of foam cushion cylinder 17 can have one or more optional pockets 25 to accommodate therapeutic imparting elements, such as heat packs 26 and/or cold packs 27 inserted therein, for therapeutic use upon the neck and/or back of the head of the user.

FIG. 6 shows another alternate embodiment with an optional detachable therapeutic imparting element such as massage segment region portion 40, attached by VELCRO® straps 41, along a segment of the surface of the foam pillow cushion 17 with massage elements 42, such as a plurality of axially (horizontally) extending ribbing rods 42, provided thereat. Each massage element 42 preferably has a thickness shown by the arrows "T-T". Other massage elements, such as beads or other massage imparting units (not shown) can be provided along the designated massage segment region portion 40, so that the user can use these massage elements 42, and rotate them out of the way to use the foam-only segmented portion on other regions of pillow 1. Preferably, massage elements 42 are made of a firm closed cell or open cell foam, such as in cylindrical "backer rods" or are made of rubber or other elastomeric material. Optionally, for persons who desire a firmer set of massage elements, massage elements 42 can be made of form or a soft flexible plastic or wood, such as cork.

Figures 7, 8:
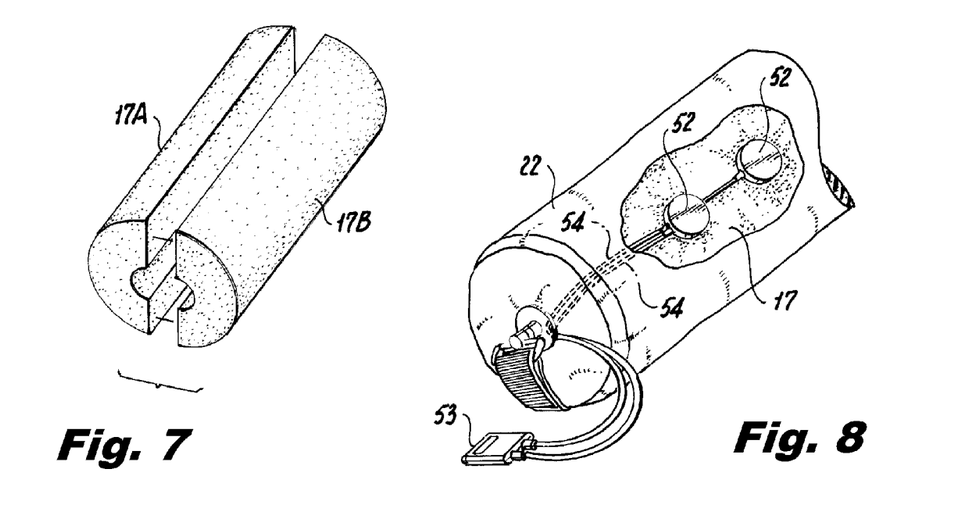
FIG. 7 is another alternate embodiment wherein the foam cushion pillow comprises two half cylindrical portions, one made of firm foam and another one of softer foam.
FIG. 8 is a detail view of yet another embodiment for a foam cushion pillow with neck massaging transducers for vibrating massage.

Also, in a further alternate embodiment shown in FIG. 7, the pillow cushion 17 can be provided in a pair of foam halves 17A and 17B, where one half segment 17A is a firm polyurethane foam and the other half segment 17B is a softer, medium polyurethane foam. In that manner the user can rotate the pillow cushion 2 from a firm half to a softer half as desired, and vice versa. It is noted that the segments need not be limited to half sections, but rather the foam cushion 17 can be divided into thirds or quarter sections (not shown) of varying firmness and softness.

In yet a further alternate embodiment shown in FIG. 8, the pockets 25 of the cover 22, or the confines of the cover 22 itself, can also carry electronic therapeutic imparting elements, such as electronic neck massaging elements, such as one or more vibration pads/transducers 52 for vibrating or other nerve stimulation massage, such as associated with a transcutaneal electronic nerve stimulation (T.E.N.S) unit 53. The T.E.N.S unit 53 has a remote power pack, such as is typically carried in a pocket or worn upon a user's belt, with wires 54, connected to the vibration pads, such as transducers 52, which are carried in pockets 25 of the cover 22, or within the confines of the cover 22 itself. Power can be provided with a low voltage battery or battery pack, such as, for example, a 9 volt "D" battery, or by connection to a vehicle cigarette lighter or cell phone jack.

Figures 9, 10:
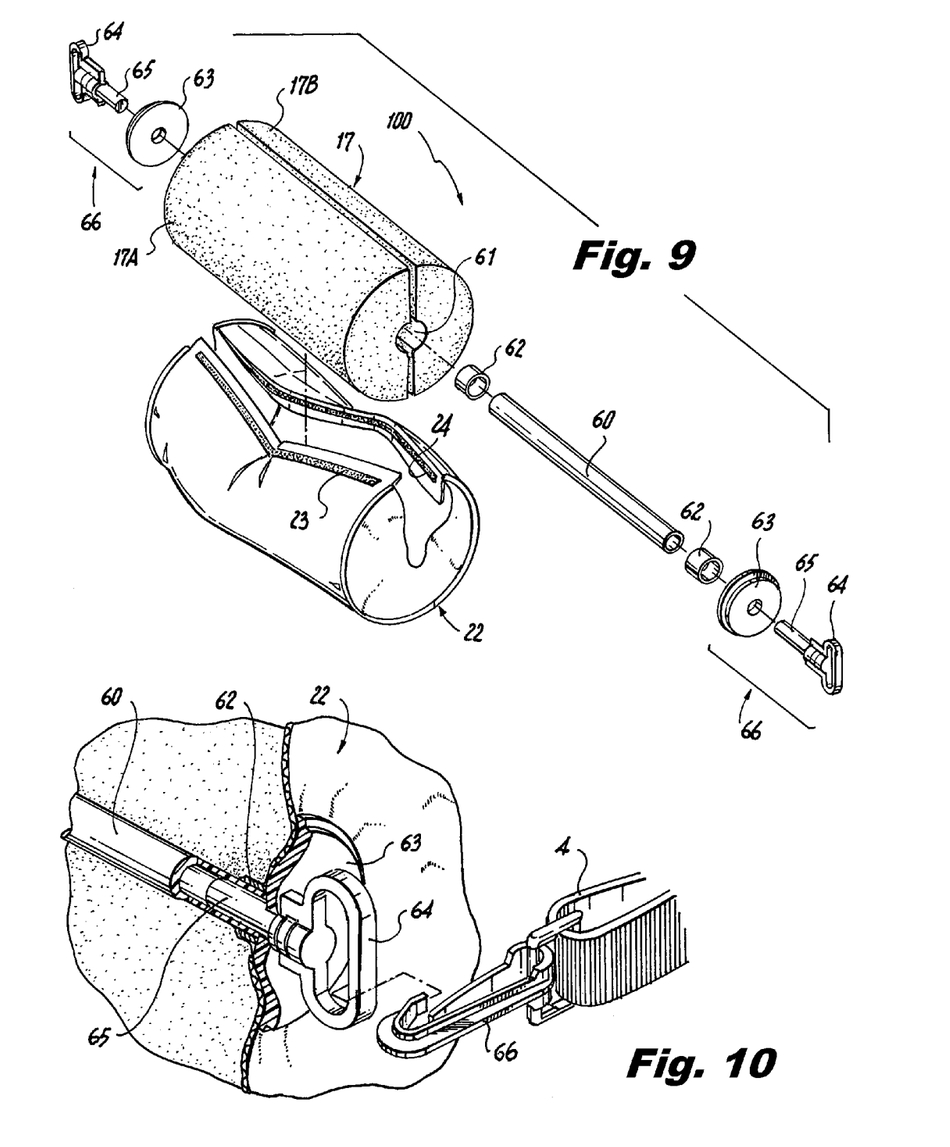
FIG. 9 is an exploded perspective view of the components of the rotatable cervical pillow of an alternate embodiment; without an internal elastic cord, whereby respective swivel assemblies are attached at opposite ends of rigid tube within the rotatable pillow.
FIG. 10 is a close-up cutaway view of the rotatable cross section subassembly thereof.

In yet another alternate embodiment of cervical pillow 100 shown in FIGS. 9 and 10, centrally located elastic cord 15 (FIG. 3) is not used in the swivel support assembly of the cervical pillow of this invention.

While FIGS. 9 and 10 show cylindrical cushion 17 formed of two halves 17A and 17B, such as shown in FIG. 7 herein, it is contemplated that cylindrical cushion can have a single radial slit extending only to the center of cushion 17, such as disclosed in FIG. 6 here.

It is also contemplated that cylindrical cushion 17 can be a once piece unit with no slits, where access to central tube 60 is through the ends of the hollow region 61 of cushion 17 accommodating tube 60.

As shown in FIG. 9, a rotatable horizontal member, such as a semi-rigid tube 60 with attached rigid bushings 62 securely fitted at each end of tube 60, such as by crimping or heat welding. The rotatable cushion is used with handles such as washers 63 and swivel strap loops 64 which have rod extensions 65. Tube 60 may be of PVC or material such as ⅜" PEX tubing which is usually used in plumbing. Since this tube 60 no longer requires an internal diameter large enough to accommodate a snap hook, it can be of smaller diameter than tube 20 shown in FIG. 3. Similarly, through hole 61 in foam cushion 17 can also be smaller commensurate with tube 60 outer diameter. Rod extensions 65 are simply press fit into the ends of tube 60 to retain the swivel strap loops 64. If rigid bushings 62 were not used at each end of tube 60, there would be too much radial expansion of the ends to retain swivel strap loops 64 with adequate force to resist withdrawal. Bushings 62 can be fabricated from short lengths of copper, aluminum, steel tubing or non-metallic plastic, such as PVC, of proper size. The end swivel fixtures or strap loops 64 therefore rotate in unison but are not connected by an elastic cord in this embodiment. As shown in the close-up view of FIG. 10, for removal of strap 4, strap 4 is preferable provided with a snap hook 66 engageable with strap loop 64.

Figure 11:
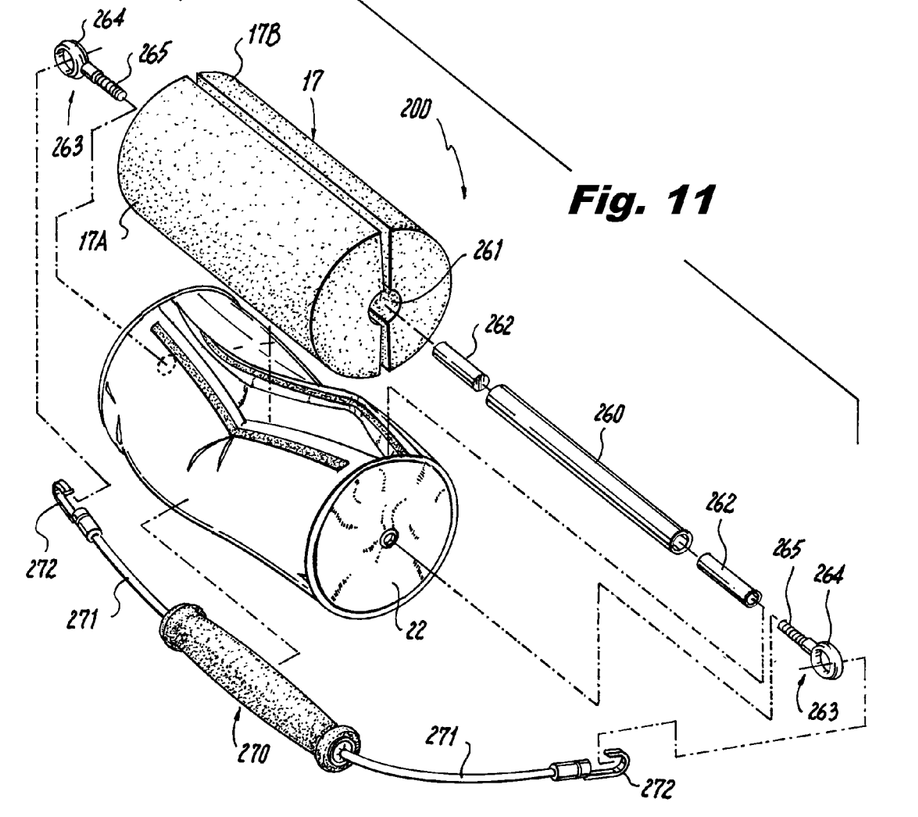

FIG. 11 is a shows an alternate threaded embodiment for a rotatable cushion 200 with central tube 260 having at opposite ends respective end clasp handles 263.

Figure 12:
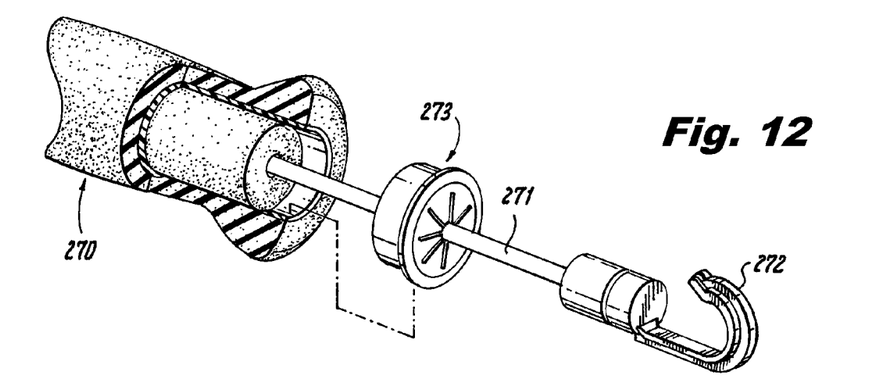

In the alternate embodiment shown in FIGS. 11 and 12 of cervical pillow 200, centrally located elastic cord 15 (FIG. 3) is also not used in the swivel support assembly of the cervical pillow 200 of this invention. As shown in FIG. 11, a rotatable horizontal member, such as a semi-rigid tube 260 has attached rigid bushings 262 securely fitted at each end of tube 260, such as by crimping or heat welding. The rotatable cushion 200 is used with threaded handles 263 with integral swivel strap loops 264 which have threaded extensions 265, which are threaded into bushings 262, or else threaded directly into a threaded end of rod 260, without the necessity of intermediary threaded bushings 262. Tube 260 may also be of PVC or material such as ⅜" PEX tubing which is usually used in plumbing. Since this tube 260 no longer requires an internal diameter large enough to accommodate a snap hook, it can also be of smaller diameter than tube 20 shown in FIG. 3. Similarly, through hole 261 in foam cushion 17 can also be smaller commensurate with tube 260's outer diameter. Threaded rod extensions 65 are simply threaded into the threaded ends of bushing 262, or directly into a threaded end of tube 260, to retain the swivel strap handles 263. Bushings 62 can be fabricated from short lengths of copper, aluminum, steel tubing or non-metallic plastic, such as PVC, of proper size. The end swivel fixtures 263 with strap loops 264 and threaded extensions 265 therefore rotate in unison but are not connected by an elastic cord in this embodiment. For removal of strap 4 from handle 263, strap 4 is preferable provided with a snap hook 66 engageable with strap loop 64, such as shown in FIGS. 9 and 10.

FIGS. 11 and 12 also shows a small auxiliary external firm massaging member 270, which has end caps 274 having elastic connecting cables 271 with hooks 272 at each distal end, engageable with strap loops 264 of handles 263 on each side of rotatable cushion 17.

It is contemplated that auxiliary external firm massaging member 270 can also engage cervical pillow 1 with rotatable cushion 17 shown in FIGS. 1-8 by attachment of hooks 272 to attachment 12 of swivel assemblies 3 therein.

Auxiliary external firm massaging member 270 can also engage cervical pillow 100 with rotatable cushion 17 shown in FIGS. 9 and 10 by attachment of hooks 272 to attachment loops 63 of the swivel assemblies 66 therein.

Bushings 62 are shown external to tube 60 in FIGS. 9 and 10. However, it is contemplated that bushings 62 can alternately be internal to tube 60, with rod extension 65 press fit therein. In an alternate embodiment in FIGS. 11 and 12, rod extension 65 can be threaded, mating with optional internal threads within an internally mounted busing 62. As a further option, tube 60 can be provided with internal threads for a threaded rod extension 66, without the need for a threaded bushing 62.

Additionally, while cover 22 is shown with a major axis slit and partial end slits in FIGS. 3 and 9, for ease of removing the cover 22 for cleaning, optionally cover 22 can be provided with only a major axis slit but no end slits, for removing the cover for cleaning. Not having the end slits helps prevent any binding of the end material while the end swivel assemblies are rotating for user comfort.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A method of providing cervical support for a user sitting in a motorized vehicle comprising the steps of:

providing a cylindrical cushion assembly, said cushion assembly comprising a cylindrical cushion freely rotatable on a horizontal axis of rotation, said cylindrical cushion being mounted on a rigid tube, and a pair of swivel assemblies, each respectively attached to each respective end of said rigid tube, said swivel assemblies abutting opposite ends of said rigid tube, whereby said cushion has 360° of rotation allowed by said swivel assemblies;

providing at least one strap and attaching an end of said strap to a respective one of said swivel assemblies at each opposite end, each distal end of each strap having a respective latch;

placing said cushion assembly on a seat back of said vehicle with said cylindrical cushion deployed horizontally and in contact with the neck of the user so that said cylindrical cushion will roll behind the neck of the user; and engaging said respective latches on the distal ends of said straps to said swivel assemblies to secure said cushion assembly in place on said seat back while said user is operating said vehicle; and enclosing said cylindrical cushion in a removable fabric cover to permit replacement and/or cleaning of said cover, said cover being a wrap around piece of fabric with engaging opposite edges provided with hook and loop fasteners to permit ready removal and replacement thereof.

2. The method of claim 1 in which providing said cushion assembly providing a cushion assembly wherein each said swivel assembly is attached at each respective end of said hollow tube by press fitting into each said respective end of said hollow tube.

3. The method of claim 2 in which providing said cushion assembly includes attaching each said swivel assembly to said hollow tube by press fitting into a bushing located at each said respective end of said hollow tube.

4. The method of claim 1 in which providing said cushion assembly includes attaching each said swivel assembly to said hollow tube by threaded engagement into each said respective end of said hollow tube.

5. The method of claim 4 in which providing said cushion assembly includes attaching each said swivel assembly to said hollow tube by threaded engagement into a threaded bushing located at each said respective end of said hollow tube.

6. The method of claim 1 in which providing said cover includes providing a cover which has an axially extending slit with at least one fastener extending along said axially extending slit for removal of said cylindrical cushion for cleaning of said cover.

7. The method of claim 6 in which providing said cover includes providing a cover with partial slits in each end of said cover.

8. The method of claim 6 in which providing said cover includes providing a cover which has no partial slits in each end of said cover.

9. The method of claim 1 further comprising the step of attaching an external massaging member with a further strap having a fastener at each end engageable with each said swivel assembly located at each end of said rotatable cushion.

10. The method of claim 1 further comprising the step of providing said cushion with at least one region accommodating at least one therapeutic imparting element selected from the group consisting of at least one elastomeric massage member, at least one electronic stimulator pad, a heat pack and a cold pack therein.

11. The method of claim 1 further comprising the step of providing said cushion with a plurality of foam sections, wherein one of said foam sections is a firmer foam than said other foam section.

* * * * *